(12) United States Patent
Fukuzawa

(10) Patent No.: US 6,901,186 B2
(45) Date of Patent: May 31, 2005

(54) OPTICAL FIBER COLLIMATOR USING GRADIENT INDEX ROD LENS

(75) Inventor: Takashi Fukuzawa, Osaka (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 187 days.

(21) Appl. No.: 10/294,149

(22) Filed: Nov. 14, 2002

(65) Prior Publication Data

US 2004/0096153 A1 May 20, 2004

(30) Foreign Application Priority Data

Nov. 15, 2001 (JP) ......................................... 2001-350533

(51) Int. Cl.[7] ............................................... G02B 6/32
(52) U.S. Cl. ............................. 385/34; 385/33; 385/67; 385/74; 385/95
(58) Field of Search ............................. 385/34, 33, 67, 385/74, 95

(56) References Cited

U.S. PATENT DOCUMENTS

| | | | |
|---|---|---|---|
| 2002/0094163 A1 * | 7/2002 | Ooyama et al. | 385/34 |
| 2002/0168140 A1 * | 11/2002 | Asano et al. | 385/34 |
| 2004/0114862 A1 * | 6/2004 | Taniyama et al. | 385/34 |

FOREIGN PATENT DOCUMENTS

| | | |
|---|---|---|
| EP | 0 370 663 A2 | 3/1990 |
| WO | WO 01/11403 A1 | 2/2001 |

OTHER PUBLICATIONS

Selfoc Product Guide, (Sep. 1993).
Duncan T. Moore, Gradient Index Optics, XP-002194081, pp. 9.1–9.9, Chapter 9.

* cited by examiner

Primary Examiner—John R. Lee
Assistant Examiner—Zia R. Hashmi
(74) Attorney, Agent, or Firm—Caesar, Rivise, Bernstein, Cohen & Pokotilow, Ltd.

(57) ABSTRACT

An optical fiber collimator using a gradient index rod lens for securing a required long opposing distance and easy handling. The collimator includes a single mode fiber and a gradient index rod lens for receiving an incident light from the single mode fiber and converting the incident light into a collimated light, or condensing an incident light and coupling the condensed incident light to the single mode fiber. A meandering period (pitch) of a ray determined by a refractive index distribution of the rod lens is decided. The gradient index rod lens has a lens length larger by 0.5 meandering periods than a minimum lens length required to obtain a predetermined opposing distance between a pair of the rod lenses.

14 Claims, 3 Drawing Sheets

OPTICAL FIBER COLLIMATOR USING GRADIENT INDEX ROD LENS

BACKGROUND OF THE INVENTION

The present invention relates to an optical fiber collimator using a gradient index rod lens.

FIG. 1 shows a conventional collimator optical device 50 having incident side and receiving side optical fiber collimators. The incident side optical fiber collimator includes an optical fiber 11 and a rod lens L1, and the receiving side optical fiber collimator includes an optical fiber 12 and a rod lens L2. The optical device 50 converts lights emitted from the single mode fiber 11 on the incident side into collimated lights by use of the collimator lens L1, and condenses the collimated lights by use of the collimator lens L2 to couple them to the single mode fiber 12 on the receiving side. The collimator lenses L1 and L2 are gradient index rod lenses having a refractive index distribution in a radial direction.

Various kinds of collimator optical devices (devices for optical communications) 50 are produced by inserting an optical function element (e.g., an optical filter, an optical isolator, an optical switch or an optical modulator) between the rod lenses L1 and L2. The device for optical communications causes a predetermined function to a light having propagated through the optical fiber 11 by use of the optical function element, and then couples the light again to the optical fiber 12. In order to use a function element (e.g., a large-sized matrix switch) requiring a long light path length and having a large size to cause the predetermined function, it is required to provide a device for optical communications having as great opposing distance (maximum collimation length Lmax) between the rod lenses L1 and L2 as possible, and as high coupling efficiency as possible.

FIG. 2 shows an optical fiber collimator 10 used in the collimator optical device 50. The optical fiber collimator 10 includes a gradient index rod lens 13, a single mode fiber 14, a capillary 15 for holding the optical fiber 14, and a glass tube 16. An incident side end face of the rod lens 13 and an end face of the optical fiber 14 are each inclined planes obliquely buffed. The rod lens 13 and the capillary 15 are fixed inside the glass tube 16 at a position where the incident side end face of the rod lens 13 and the end face of the optical fiber 14 are away from each other by a focal length of the rod lens 13.

In the optical fiber collimator 10, it is necessary to increase the focal length of the rod lens 13 and enlarge a beam diameter, in order to increase the opposing distance. The focal length of the rod lens 13 can be changed by adjusting a lens length Z of the rod lens 13. Here, the "lens length" is the length between both the end faces of the rod lens. In the case of the rod lens 13 having an inclined plane, the "lens length" is the distance from an intersection point of the inclined plane and a center axis to the incident side end face (see FIG. 6). Since the gradient index rod lens has a meandering period (pitch) of a ray determined by its refractive index distribution, the lens length Z is expressed by pitch as a unit.

For example, in the case of a normal rod lens having a lens element diameter of $\phi$ 1.8 mm and a lens length Z of 0.25 pitches, the opposing distance is about 70 mm. On the contrary, if the lens length is changed to 0.1 pitches, the opposing distance extends up to about 200 mm. If the lens length Z of the rod lens having a lens element diameter of $\phi$ 0.1 mm is changed from 0.25 pitches to 0.1 pitches, the opposing distance extends from about 20 mm to about 70 mm.

In the conventional optical fiber collimator 10, it is necessary to decrease the lens length Z in order to increase the opposing distance. For example, if the lens element diameter of the rod lens 13 is $\phi$ 1.8 mm and the lens length Z thereof is 0.23 pitches, the actual lens length Z is 4.8 mm. If the lens element diameter of the lens 13 is $\phi$ 1.8 mm and the lens length Z thereof is 0.1 pitches, the actual lens length Z is about 2 mm. If the lens element diameter of the lens 13 is $\phi$ 1.0 mm and the lens length Z thereof is 0.1 pitches, the actual lens length Z is 1.2 mm. However, if the lens length Z is small, the following problems are caused.

(1) As shown in FIG. 3, if a short rod lens 13A having a length of, for example, 1.2 mm is set to the glass tube 16, the rod lens 13A might incline because an axial length of an outer circumferential surface (referential surface) of the rod lens 13A is small. If the rod lens 13A inclines, the collimated light (emitted light) emitted from the rod lens 13A inclines with respect to the axial direction, which decreases the coupling efficiency. As a result, reliability might be decreased.

(2) If the length of the lens is small, it is difficult to cut or buff the lens when the rod lens 13A is manufactured. Especially, it is sometimes impossible to obliquely buff the end face of the lens. This is because it is difficult to hold the rod lens 13A in the cutting and buffing processing.

(3) It is difficult to handle the lens if the length of the lens is small.

SUMMARY OF THE INVENTION

An object of the present invention is to provide an optical fiber collimator using a gradient index rod lens that secures a required long opposing distance and is easy to handle.

To attain the aforementioned object, the present invention provides an optical fiber collimator including: a single mode fiber; and a gradient index rod lens for receiving an incident light from the single mode fiber and converting the incident light into a collimated light, or condensing an incident light and coupling the condensed incident light to the single mode fiber. A meandering period (pitch) of a ray determined by a refractive index distribution of the rod lens is decided. The gradient index rod lens has a lens length larger by 0.5 meandering periods than a minimum lens length required to obtain a predetermined opposing distance between a pair of the rod lenses.

Furthermore, the present invention provides a gradient index rod lens optically coupled to an optical fiber. The rod lens has a refractive index distribution for deciding a meandering period (pitch) of a ray and a lens length larger by 0.5 meandering periods than a minimum lens length required to obtain a predetermined opposing distance between a pair of the rod lenses.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
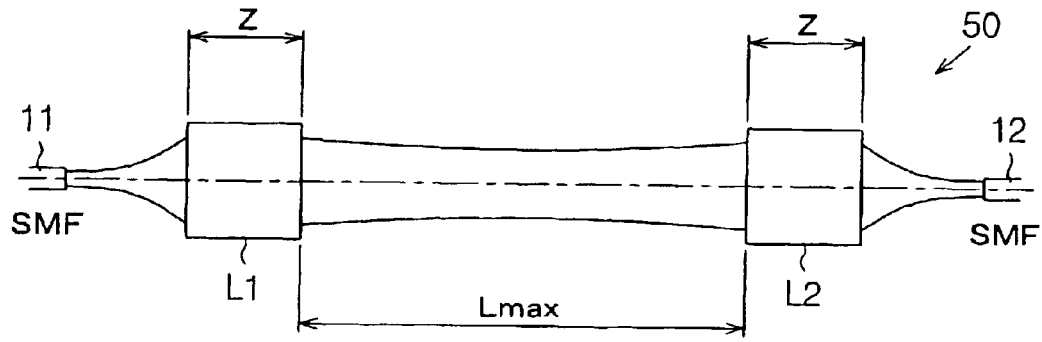
FIG. 1 is a schematic constitution view showing a conventional collimator optical device.
Figure 2:
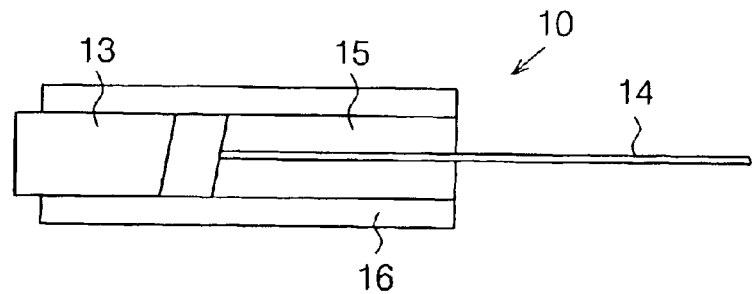
FIG. 2 is a schematic sectional view of a conventional optical fiber collimator.
Figure 3:
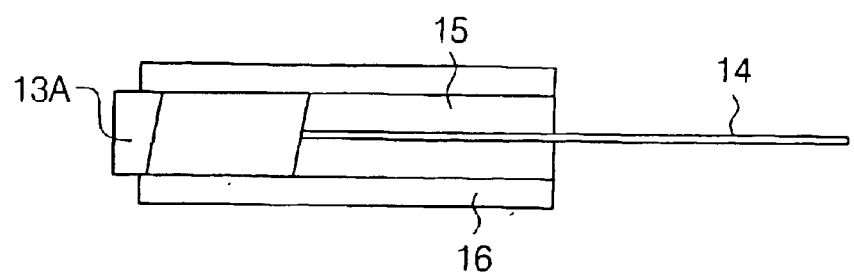
FIG. 3 is a schematic sectional view of another conventional optical fiber collimator.

In the drawings, like numerals are used for like elements throughout.

Figure 4:
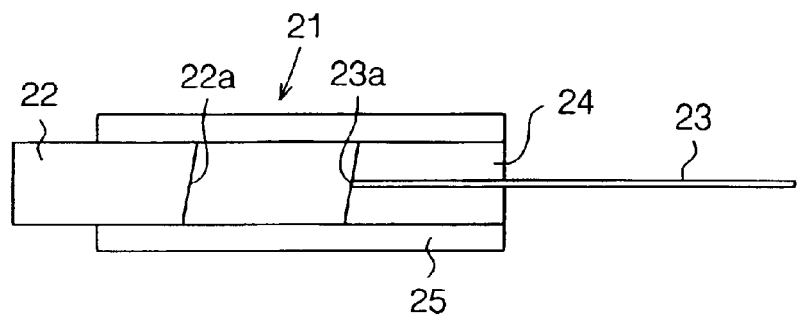
FIG. 4 is a schematic sectional view of an optical fiber collimator in accordance with a first embodiment of the present invention.

FIG. 4 is a schematic sectional view of an optical fiber collimator 21 using a gradient index rod lens in accordance with a first embodiment of the present invention. The optical fiber collimator 21 includes a gradient index rod lens 22, a single mode fiber 23, a capillary 24 for holding the optical fiber 23, and a glass tube 25. An incident side end face 22a of the gradient index rod lens (hereinafter referred to as a rod lens) 22 and an end face 23a of the optical fiber 23 are each inclined planes obliquely buffed. The single mode fiber (hereinafter referred to as an optical fiber) 23 is inserted into a fiber insertion hole (not shown) of the capillary 24 and integrated with the capillary 24 by use of an adhesive agent. The rod lens 22 and the capillary 24 are fixed inside the glass tube 25 by use of, for example, an adhesive agent, at a position where the incident side end face 22a of the rod lens 22 and the end face 23a of the optical fiber 23 are away from each other by a focal length of the rod lens 22.

Figure 5:
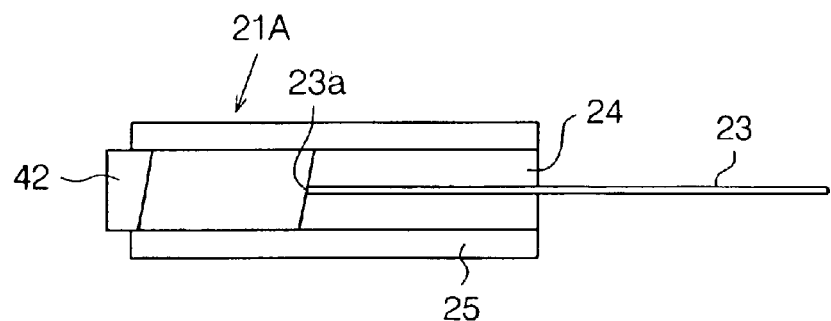
FIG. 5 is a schematic sectional view of the conventional optical fiber collimator including a rod lens having a smaller lens length than a lens length of a rod lens of the collimator of FIG. 4.

FIG. 5 is a schematic sectional view of a conventional optical fiber collimator 21A including a rod lens 42 having a smaller lens length than the lens length of the rod lens 22. The constitution of the optical fiber collimator 21A except for the rod lens 42 is the same as that of the optical fiber collimator 21.

The lens element diameter of the rod lens 42 is φ 1.0 mm, and its actual lens length Z is 1.2 mm. The opposing distance of the rod lens 42 is about 70 mm.

Figure 6:
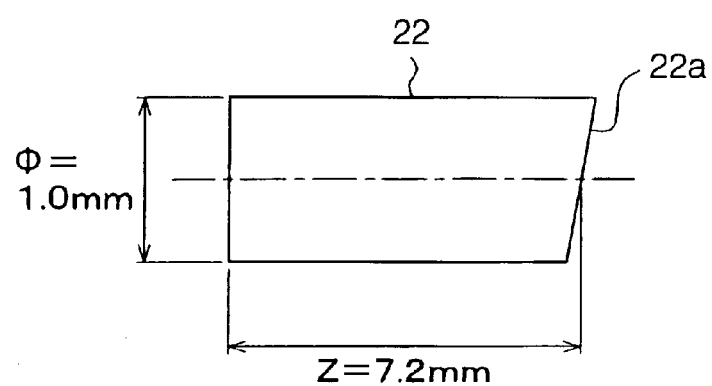
FIG. 6 is an enlarged view of the rod lens of the optical fiber collimator of FIG. 4.

The lens element diameter of the rod lens 22 is φ 1.0 mm, and the actual lens length Z of the rod lens 22 is 7.2 mm (see FIG. 6). The lens length Z of the rod lens 22 is larger than the lens length (minimum lens length) Z of the rod lens 42 (e.g., 0.1 pitches) by 0.5 pitches (½ meandering periods). Therefore, the rod lens 22 makes it possible to obtain an opposing distance of about 70 mm equal to the opposing distance of the rod lens 42.

Figure 7:
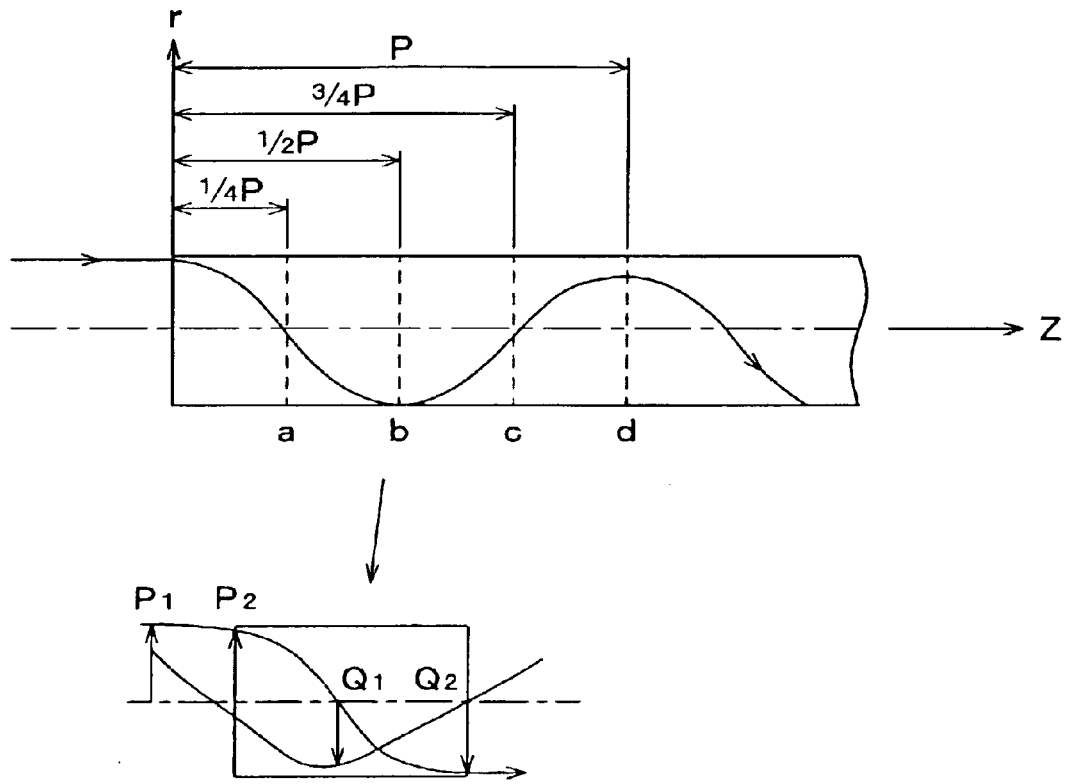
FIG. 7 is an explanatory view showing an imaging state of the rod lens of ½ pitch.

FIG. 7 shows the relation between a meandering period (pitch) P of a ray and the lens length Z. Normally, when the lens length Z of the gradient index rod lens is increased by ½ pitches, an image is only inverted at both ends having a length of ½ pitches ($P_1 \rightarrow Q_1$, $P_2 \rightarrow Q_2$: see FIG. 7), but the magnification of the lens is not changed. Therefore, the focal length of the lens is not changed. Owing to the characteristics of the gradient index rod lens, the rod lens 22 makes it possible to obtain the same opposing distance as that of the rod lens 42, and the rod lens 22 can have a lens length Z about six times as large as that of the rod lens 42.

Hereinafter, the characteristics of the gradient index rod lens will be described using Equations.

When a distance in a radial direction from the center of a section of the rod lens is r, a refractive index distribution n (r) of the gradient index rod lens is expressed by Equation (1) as follows:

$$n(r) = n_0 (1 - Ar^2/2) \tag{1}$$

In this case, a focal length f of the lens is expressed by Equation (2) as follows:

$$f = 1/\{n_0 \sqrt{A} \cdot \sin(\sqrt{A} \cdot Z)\} \tag{2}$$

In Equations (1) and (2), $n_0$ is the refractive index at the center of the rod lens, $\sqrt{A}$ is a refractive index distribution constant, and Z is the lens length. As apparent from Equation (2), the focal length f changes periodically with the lens length Z.

The meandering period (pitch) P of the lens is expressed by Equation (3) as follows:

$$P = 2\pi/\sqrt{A} \tag{3}$$

From Equations (2) and (3), the focal length f has the same value (absolute value) on a period of P/2 (0.5 pitches), with respect to the lens length Z. That is, the focal length f does not change even if the lens length Z is increased by P/2, so that the same lens characteristics can be obtained. In Equation (2), the sign of sin is inverted every P/2 periods, and the image is inverted in accordance with the inversion of the sign of sin.

A maximum collimator length Lmax is expressed by Equation (4) as follows:

$$Lmax = 1/\{n_0 \sqrt{A} \cdot \tan(\sqrt{A} \cdot Z)\} = f \cdot \cos(\sqrt{A} \cdot Z) \tag{4}$$

Therefore, the maximum collimator length Lmax changes in the same period as that of the focal length f with respect to the lens length Z.

The optical fiber collimator 21 in the first embodiment has the following advantages.

(1) The lens length Z of the rod lens 22 is larger than the lens length (minimum lens length) Z of the rod lens 42 (0.1 pitches) by 0.5 pitches. Therefore, it is possible to obtain the same opposing distance (about 70 mm) as that of the rod lens 42, and it is possible to use the rod lens 22 having a length of 7.2 mm, which is about six times as large as that of the rod lens 42. In this way, the required long opposing distance can be secured, and an emitted light of the rod lens 22 can be prevented from inclining with respect to the axial direction of the lens, so that the coupling efficiency can be prevented from being decreased. Therefore, it is possible to improve the reliability while securing the required long opposing distance.

(2) The lens length Z of the rod lens 22 is about six times as large as that of the rod lens 42, so that it is easy to handle the lens 22. Therefore, it is easy to hold the lens 22 in the buffing processing of, for example, cutting or obliquely buffing the rod lens 22, thereby facilitating the cutting or oblique buffing when the lens 22 is manufactured.

The gradient index rod lens used in the optical fiber collimator in accordance with a second embodiment of the present invention has a lens diameter of φ 1.8 mm and a lens length Z of about 12 mm. The opposing distance of the rod lens is about 200 mm. The lens length Z of the rod lens in the second embodiment is larger by 0.5 pitches than the lens length Z necessary to obtain an opposing distance of about 200 mm (0.1 pitches, about 2.0 mm).

The optical fiber collimator in the second embodiment has the same advantages as the optical fiber collimator in the first embodiment.

It should be apparent to those skilled in the art that the present invention may be embodied in many other specific forms without departing from the spirit or scope of the invention. Particularly, it should be understood that the invention may be embodied in the following forms.

In each embodiment, the minimum lens length required to obtain the opposing distance, which is increased by 0.5 pitches, is not limited to 0.1 pitches. In short, the rod lens may have a length increased by 0.5 pitches, with respect to the minimum lens length. Preferably, the minimum lens length is 0.1 pitches or more.

The minimum lens length is preferably from about 0.7 or more to about 2 mm or less.

In each embodiment, the lens element diameter is arbitrary.

In each embodiment, any of the following methods may be applied as a "method of increasing the lens length (pitch) Z". (1) A method of cutting a rod lens to let it have (0.1+0.5) pitches, out of a lens base material that is the same as a rod lens having a small lens length Z, for example, a rod lens of 0.1 pitches. (2) A method of cutting a rod lens having a small lens length, for example, a lens of 0.1 pitches, to let it have 0.5 pitches, out of a lens base metal having the same lens element diameter as a lens of 0.1 pitches, and then joining the cut rod lens to the lens of 0.1 pitches.

Figure 8:
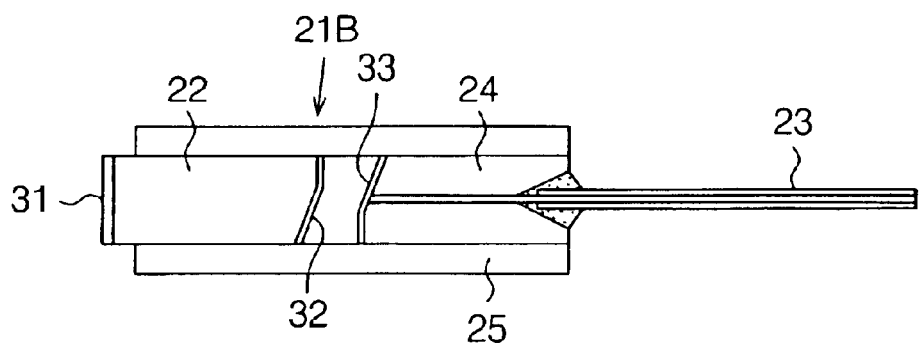
FIG. 8 is a schematic sectional view of the optical fiber collimator in accordance with a modification.

The present invention can also be applied to an optical fiber collimator 21B in which anti-reflection measures are taken as shown in FIG. 8. In the optical fiber collimator 21B, anti-reflection films 31, 32 and 33 are formed on both end faces of the rod lens 22 and the end face of the optical fiber 23, respectively.

Therefore, the present examples and embodiments are to be considered as illustrative and not restrictive and the invention is not to be limited to the details given herein, but may be modified within the scope and equivalence of the appended claims.

What is claimed is:

1. An optical fiber collimator comprising:

a single mode fiber; and a gradient index rod lens for receiving an incident light from the single mode fiber and converting the incident light into a collimated light, or condensing an incident light and coupling the condensed incident light to the single mode fiber; wherein a meandering period (pitch) of a ray determined by a refractive index distribution of the rod lens is decided; and the gradient index rod lens has a lens length larger by 0.5 meandering periods than a minimum lens length required to obtain a predetermined opposing distance between a pair of the rod lenses.

2. The collimator according to claim 1, wherein the minimum lens length is approximately 0.7 mm or more and approximately 2 mm or less.

3. The collimator according to claim 1, wherein the predetermined opposing distance is a maximum collimation length.

4. The collimator according to claim 1, wherein one end face of the rod lens and one end face of the optical fiber incline with respect to a center axis of the rod lens.

5. The collimator according to claim 1, further comprising:

a cylindrical holder for holding the rod lens; and a capillary, stored in the cylindrical holder, for holding the optical fiber; wherein the optical fiber and the rod lens are held in a manner that one end face of the rod lens and one end face of the optical fiber are kept away by about a focal length of the rod lens.

6. The collimator according to claim 5, wherein the minimum lens length is about 0.7 mm or more and about 2 mm or less.

7. The collimator according to claim 5, wherein the predetermined opposing distance is a maximum collimation length.

8. The collimator according to claim 5, wherein the one end face of the rod lens and the one end face of the optical fiber incline with respect to a center axis of the rod lens.

9. The collimator according to claim 8, further comprising:

a first anti-reflection film formed on the one end face of the rod lens; and a second anti-reflection film formed on the one end face of the optical fiber.

10. A gradient index rod lens optically coupled to an optical fiber, the rod lens having:

a refractive index distribution for deciding a meandering period (pitch) of a ray; and a lens length larger by 0.5 meandering periods than a minimum lens length required to obtain a predetermined opposing distance between a pair of the rod lenses.

11. The rod lens according to claim 10, wherein the minimum lens length is approximately 0.7 mm or more and approximately 2 mm or less.

12. The rod lens according to claim 10, wherein the predetermined opposing distance is a maximum collimation length.

13. The rod lens according to claim 10, wherein one end face opposite to the optical fiber inclines with respect to a center axis of the rod lens.

14. The rod lens according to claim 13, further comprising:

an anti-reflection film formed on the one end face.

* * * * *